(12) United States Patent
Becker

(10) Patent No.: US 9,971,390 B1
(45) Date of Patent: May 15, 2018

(54) PROCESSOR ENERGY CONSUMPTION RATE LIMITING SYSTEM

(71) Applicant: Apple Inc., Cupertino, CA (US)

(72) Inventor: Daniel U. Becker, San Jose, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 14/988,451

(22) Filed: Jan. 5, 2016

(51) Int. Cl.
*G06F 1/32* (2006.01)
*G06F 1/28* (2006.01)
*G06F 9/38* (2018.01)

(52) U.S. Cl.
CPC .............. *G06F 1/28* (2013.01); *G06F 1/3243* (2013.01); *G06F 9/3867* (2013.01)

(58) Field of Classification Search
CPC .................................... G06F 1/32; G06F 1/26
USPC ....... 713/300, 310, 320, 322, 323, 324, 345, 713/375
See application file for complete search history.

(56) References Cited

U.S. PATENT DOCUMENTS

| | | | |
|---|---|---|---|
| 6,539,008 B1 * | 3/2003 | Ahn | H04W 52/221 370/311 |
| 6,564,328 B1 | 5/2003 | Grochowski et al. | |
| 8,788,779 B1 * | 7/2014 | Horn | G06F 3/0616 711/103 |
| 9,069,555 B2 | 6/2015 | Fetzer et al. | |
| 2007/0165747 A1 * | 7/2007 | May | H04B 15/02 375/316 |
| 2012/0105050 A1 * | 5/2012 | Naffziger | G01R 31/31721 324/103 R |
| 2012/0144221 A1 | 6/2012 | Naffziger et al. | |
| 2015/0089249 A1 | 3/2015 | Hannon et al. | |

* cited by examiner

*Primary Examiner* — Jaweed A Abbaszadeh
*Assistant Examiner* — Keshab Pandey
(74) *Attorney, Agent, or Firm* — Meyertons, Hood, Kivlin, Kowert & Goetzel, P.C.

(57) ABSTRACT

In some embodiments, a processor core includes an energy tracking circuit and an execution management circuit. The energy tracking circuit is configured to determine an amount of remaining allocated energy of the processor core. The execution management circuit is configured to make a determination whether to stall execution of one or more pipeline operations at the processor core based on a comparison of the amount of remaining allocated energy to a stall threshold. The determination involves applying one or more pseudo-random components to the amount of remaining allocated energy, the stall threshold, or both. The determination is made such that the smaller the amount of remaining allocated energy, the more likely the execution of one or more instructions is to be stalled.

20 Claims, 9 Drawing Sheets

PROCESSOR ENERGY CONSUMPTION RATE LIMITING SYSTEM

BACKGROUND

Technical Field

This disclosure relates generally to a processor energy consumption rate limiting system.

Description of the Related Art

Many devices include multiple processor cores. Processor cores can be significant energy consumers, especially under certain workloads. Accordingly, there can be operating points (combinations of supply voltage magnitude and operating frequency) at which, if all the processor cores are actively executing, the device is at risk of exceeding a capacity of a power supply in the device. That is, the power supply is only capable of sourcing a certain amount of energy per unit time (e.g., a clock cycle). If one or more processor cores are actively executing energy consumption-intensive workloads at some operating points, the resulting aggregate energy consumption rate can, in some cases, exceed the capacity of the power supply. Exceeding the capacity of the power supply may cause erroneous operation (e.g., the supply voltage magnitude may drop to a point at which the device no longer operates properly at the operating frequency).

One way to limit the energy consumption rate of the device is to reduce the rate at which the workloads are executed, a process called throttling. One form of throttling involves preventing a processor core from executing a portion of a workload during a current clock cycle, instead inserting a stall instruction into a pipeline of the processor core. However, when multiple processor cores receive energy from the same power supply within a window of time, some throttling protocols may result in the processor cores all determining to throttle, for example, during a same clock cycle and all determining to resume execution during a same clock cycle. Processor cores throttling or resuming during a same clock cycle may inject undesired noise into the power supply network. The noise in the power supply network may cause erroneous operation or may otherwise waste energy (e.g., through increased voltage guard band requirements).

SUMMARY

In various embodiments, a credit-based processor energy consumption rate limiting system is disclosed that includes a plurality of processor cores and a credit distribution circuit. The credit distribution circuit receives credits at a certain rate and distributes them to one or more of the processor cores. The decision which processor core to distribute a given credit to may be based on requests for additional credits corresponding to (e.g., generated on behalf of or generated by) the processor cores. A particular processor core may determine, based on a remaining number of credits available to the particular processor core, whether to perform one or more pipeline operations. Additionally, the particular processor core may deduct, based on determining to perform the one or more pipeline operations, one or more credits from a remaining quantity of credits allocated to the particular processor core; the number of credits deducted may correspond to the energy cost of performing the operation. Using credits to determine whether to perform pipeline operations may limit an average rate of energy consumption of the system to the rate at which new credits are received by the distribution circuit, and it may therefore allow the processor cores to perform pipeline operations independently without exceeding a power supply capacity. Additionally, the system may be able to change an average rate of energy consumption of the system more quickly, as compared to a system that does not use credits to determine whether to perform pipeline operations.

In various embodiments, an energy consumption rate limiting system is disclosed that includes a processor core including an energy tracking circuit and an execution management circuit. The energy tracking circuit may determine an amount of energy available to be consumed by the processor core during a particular amount of time. The execution management circuit may make a determination whether to stall or otherwise delay (e.g., by throttling) execution of one or more pipeline operations at the processor core based on a comparison between the amount of energy available and a stall threshold. The determination may involve applying a pseudo-random component to the amount of energy available to the processor core, to the stall threshold, or to both. The determination may be made such that the less energy that is available during the particular amount of time, the more likely the execution of one or more instructions is to be stalled. Accordingly, the energy consumption rate limiting system may use a pseudo-random component to determine whether to perform pipeline operations. As a result, a system including multiple processor cores and/or execution pipelines and using a pseudo-random component may stall execution of one or more instructions at the cores, at the execution pipelines, or at both, in a more staggered manner, injecting less noise into a power network of the system, as compared to a system including multiple processor cores and execution pipelines and not using a pseudo-random component.

Figure 1:
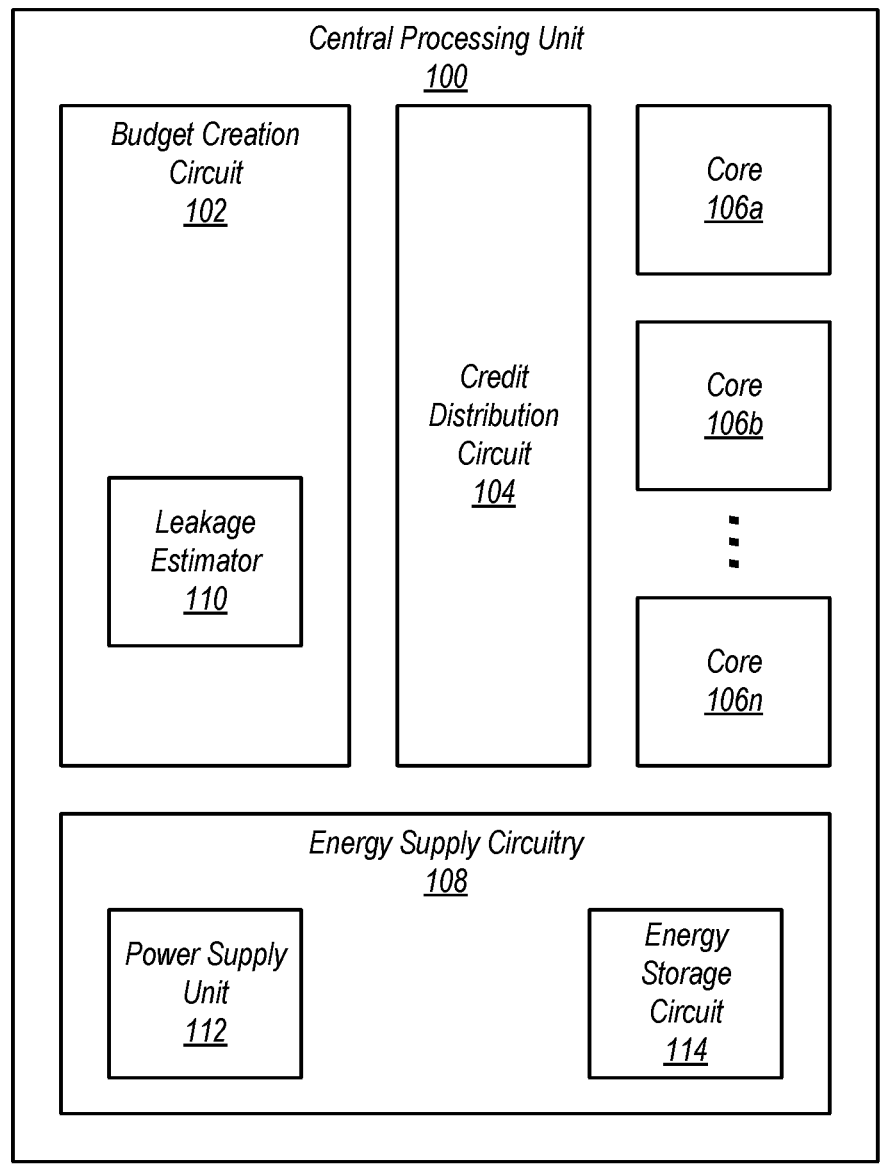
FIG. 1 is a block diagram illustrating one embodiment of an exemplary processor energy consumption rate limiting system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software construct such as an application programming interface (API).

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. §112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a system having eight processor cores, the terms "first processor core" and "second processor core" can be used to refer to any two of the eight processor cores, and not, for example, just logical processor cores 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

An energy consumption rate limiting system is disclosed that regulates whether processor cores of a system are authorized to perform one or more pipeline operations at a given point in time. Performing the one or more pipeline operations may include sending some set of values to respective pipelines, where the values are usable to process at least a portion of an instruction. When the one or more pipeline operations are not performed (e.g., delayed), an associated amount of energy is not consumed by the processor cores, and an associated rate of energy consumption of the system is therefore reduced. Embodiments of the energy consumption rate limiting system described herein may implement various forms of one or both of two concepts to manage (e.g., limit or otherwise control) the rate of energy consumption of processor cores. Accordingly, in some embodiments, some portions of the systems described herein may not be present or may not be used as described herein.

In one embodiment, the processor cores are allocated respective quantities of credits, where the credits available to a processor core indicate an amount (e.g., a maximum amount) of energy the processor core is authorized to consume during a particular window of time (e.g., a clock cycle or a fixed number of clock cycles). In some cases, credits are allocated to the processor cores periodically. After the processor cores are allocated energy credits, the processor cores may consume the energy credits by performing pipeline operations (e.g., executing at least portions of instructions). The processor cores may delay performance of one or more pipeline operations based on a number of respective remaining credits (e.g., due to an insufficient number of remaining credits). In some cases, performance of the one or more pipeline operations may be resumed at a later time, such as when additional credits are allocated. If a processor core does not use all allocated credits during a particular window of time, in some cases, the processor core may use the remaining allocated credits during a future window of time (e.g., credits may roll over between windows of time up to a maximum credit budget of the processor cores). Use of a credit distribution scheme may allow the system to quickly and flexibly control a rate of energy consumption by the processor cores without exceeding a maximum energy supply rate of the system (e.g., based on the power supply).

As noted above, energy allocations are distributed to multiple cores (e.g., using a credit distribution circuit) from a shared supply of energy (e.g., energy credits received by the credit distribution circuit in each clock cycle). In some cases, the amount of energy allocated to one or more cores may be exhausted, causing the one or more cores to delay performance of one or more respective pipeline operations until additional energy is allocated to the one or more cores. Accordingly, in some cases, the one or more cores may all determine to delay performance of one or more respective pipeline operations, for example, during a same clock cycle, and to perform (e.g., to resume performing) the one or more pipeline operations during a same clock cycle (e.g., after the additional energy credits are distributed). The multiple cores delaying the performance of the one or more respective pipeline operations during a same clock cycle and performing the one or more respective pipeline operations during another same clock cycle may add additional noise to a power supply network of the system. In one embodiment, at least two of the processor cores and/or execution pipelines apply a respective pseudo-random component to a respective current amount of remaining allocated energy of the processor core (e.g., a number of credits allocated to the processor core), a respective stall threshold, or both. Use of the respective pseudo-random components may cause the processor cores to delay performing respective pipeline operations (e.g., to avoid exhausting respective allocated energy credits) in a staggered manner. As a result, a noise level of a power supply network of the system may be reduced, as compared to a system where pseudo-random components are not used.

As used herein, "pseudo-random components" refer to numbers within a particular range of values generated by a processing device. The pseudo-random components may be generated in a repeatable sequence (e.g., using a linear feedback shift register (LFSR)) or may be truly random (e.g., generated based on a least significant digit voltage measurement of the system).

Although this disclosure is written in terms of energy consumption and energy consumption rate limiting, it is noted that similar systems could be created that operate based on other related units of measure (e.g., current and rate of charge depletion). Accordingly, when "energy" is used herein, other related units of measure are similarly considered.

This disclosure initially describes, with reference to FIG. 1, various portions of various embodiments of an energy consumption rate limiting system. Example processes performed by some embodiments of an energy consumption rate limiting system are described with reference to FIG. 2. Example processes performed by some embodiments of a processor core of an energy consumption rate limiting system are described with reference to FIG. 3. A visualization of some concepts utilized as part of some embodiments of an energy consumption rate limiting system are described with reference to FIG. 4. Methods performed by an embodiment of an energy consumption rate limiting system using credits are described with reference to FIGS. 5 and 6. Methods performed by an embodiment of an energy consumption rate limiting system using a pseudo-random component are described with reference to FIGS. 7 and 8. The techniques and structures described herein, however, are in no way limited to the one or more energy consumption rate limiting systems described with reference to FIGS. 1-8; rather, this context is provided only as one or more possible implementations. Finally, an exemplary computing system that includes an energy consumption rate limiting system is described with reference to FIG. 9.

Turning now to FIG. 1, a block diagram of one embodiment of an exemplary central processing unit 100 configured to limit a rate of energy consumption is shown. In the illustrated embodiment, central processing unit 100 includes budget creation circuit 102, credit distribution circuit 104, cores 106a-n, and energy supply circuitry 108. Budget creation circuit 102 includes leakage estimator 110. Energy supply circuitry 108 includes power supply unit 112 and energy storage circuit 114.

Energy supply circuitry 108 includes one or more devices that provide energy to various portions of the system, including, in some embodiments, budget creation circuit 102, credit distribution circuit 104, and cores 106a-n. Accordingly, energy supply circuitry 108 includes power supply unit 112, which regulates voltage for central processing unit 100. Energy supply circuitry 108 may provide energy to central processing unit 100 at a particular maximum rate (e.g., may provide a particular amount of power), which may be configurable. However, in the illustrated embodiment, under certain workloads portions of central processing unit 100 (e.g., cores 106a-n) may exceed respective power allocations, thus causing energy demands of central processing unit 100 to exceed the particular maximum rate. Energy storage circuit 114 may store energy and may provide the stored energy to various portions of central processing unit 100 (e.g., cores 106a-n) when the energy demands of central processing unit 100 exceed the particular maximum rate. Energy storage circuit 114 may store excess energy produced by power supply unit 112 if energy demands of central processing unit 100 do not exceed a current output of power supply unit 112. In some embodiments, energy storage circuit 114 is formed by a plurality of decoupling capacitors.

Accordingly, within a specific window of time, a certain maximum amount of energy from energy supply circuitry 108 may be available for use at various portions of central processing unit 100. The various portions of central processing unit 100 may use corresponding portions of the energy as needed during the window of time (e.g., immediately or gradually over the window of time).

To illustrate, power supply unit 112 may periodically produce 5000 watt-hours to be used by central processing unit 100 in periodic time windows of one hour each, and energy storage circuit 114 may store an additional 5000 watt-hours (some or all of which may be consumed by central processing unit 100 in a single time window or over multiple time windows). Of the 10,000 watt-hours available during a particular time window, 8000 watt-hours may be allocated to cores 106a-d. In some embodiments, the 8000 watt-hours may be represented by 80 credits (e.g., one credit represents 100 watt-hours). The 8000 watt-hours may be distributed evenly between cores 106a-d (e.g., 2000 watt-hours each) or unevenly between cores 106a-d (e.g., cores 106a and 106b are allocated 3000 watt-hours and cores 106c and 106d are allocated 1000 watt-hours). Different cores may consume some or all of the allocated energy differently. For example, if cores 106a-d receive 2000 watt-hours each, core 106a may consume 1900 watt-hours during a first 5 minutes of the hour and may consume the remaining 100 watt-hours by performing a stall process during the remaining 55 minutes of the hour. However, core 106b may consume 30 watt-hours per minute (e.g., 1800 watt-hours total) during the hour. Some cores may not consume all of the allocated energy during the particular time window. Accordingly, at least some energy may remain at energy storage circuit 114 at the end of the particular time window and will be available for use in subsequent windows (e.g., in addition to additional energy produced by power supply unit 112).

Budget creation circuit 102 may determine, based on the particular maximum rate from power supply unit 112, an energy budget for cores 106a-n for a time window. For example, budget creation circuit 102 may include a lookup table that indicates the energy budget based on a current energy consumption state of central processing unit 100, a desired energy consumption state of central processing unit 100, or both. Budget creation circuit 102 may indicate the energy budget to credit distribution circuit 104. In some embodiments, leakage estimator 110 may estimate an amount of leakage associated with the current or desired energy consumption state of the central processing unit, and budget creation circuit 102 may reduce the energy budget using the estimated amount of leakage. In various embodiments, budget creation circuit 102 may convert the energy budget into units of switching capacitance and may indicate the energy budget using one or more switching capacitance values. As discussed further below, when the energy budget is indicated using units of switching capacitance, cores 106a-n may track energy usage more efficiently, as compared to a system where the energy budget is indicated using units of energy (e.g., joules) or units of charge. In a particular embodiment, budget creation circuit 102 may indicate the energy budget to credit distribution circuit 104 by indicating a total credit budget (e.g., a maximum number of credits) to be allocated during a corresponding time window. The credits may be in units of switching capacitance or in other units (e.g., joules).

As discussed further below, credit distribution circuit 104 (e.g., an energy permission circuit) may receive requests for additional energy for cores 106a-n (e.g., from cores 106a-n or from one or more other circuits) and may provide, to cores 106a-n, respective indications of permission to use additional energy based on the energy budget. In some embodiments, the indications specify or otherwise indicate a number of credits allocated to the respective cores 106a-n, where the credits are indicative of the amount of additional energy the respective cores 106a-n are authorized to consume. The indications may be sent in accordance with an allocation scheme at credit distribution circuit 104 (e.g., a round robin allocation scheme, a priority-based allocation scheme, or another allocation scheme). Accordingly, credit distribution circuit 104 may control energy consumption of cores 106a-n. As a result, in some cases, some cores (e.g., core 106a) may be authorized to consume more energy than other cores (e.g., core 106b). Thus, credit distribution circuit 104 may provide flexibility regarding energy consumption of cores 106a-n.

Cores 106a-n may receive instructions indicative of one or more respective pipeline operations to be performed. Cores 106a-n may also track a respective amount of energy (e.g., a respective number of credits) allocated to cores 106a-n, up to respective maximum amounts of energy. In some embodiments, the respective maximum amounts of energy may be based on an amount of energy that can be stored at energy storage circuit 114 (e.g., an amount of energy sufficient to support all cores 106a-n consuming respective allocated energy during a same time window). Based on the respective amounts of energy, cores 106a-n may selectively determine whether to delay performance of the one or more respective pipeline operations. Cores 106a-n may be more likely to delay performance of one or more respective pipeline operations based at least in part on respective amounts of allocated energy indicated by respective internal credit trackers 226a-n. In some embodiments, a total amount of allocated energy to cores 106a-n may correspond to an amount of energy stored by energy storage circuit 114. As discussed further below, cores 106a-n may delay performance of the one or more respective pipeline operations by executing at least a portion of a stall instruction. Executing at least the portion of the stall instruction may consume less energy than performing the one or more respective pipeline operations. In some embodiments, cores 106a-n may be configured to share credits with other cores. For example, in response to core 106a having fewer credits than a request threshold, core 106a may indicate to one or more other cores of cores 106a-n that core 106a has fewer credits than the request threshold. In response to the indication from core 106a, core 106b may determine that core 106b has more credits than a sharing threshold and provide one or more credits to core 106a.

In response to a change in the energy budget, credit distribution circuit 104 may be used to adjust energy consumption of the cores 106a-n within particular windows of time. For example, credit distribution circuit 104 may provide additional credits for a particular window of time to cores 106a-n in response to one or more requests for additional credits. As another example, credit distribution circuit 104 may not provide additional credits or may provide fewer than a requested number of credits to cores 106a-n for the particular window of time in response to the requests for additional credits. For example, in response to a request from core 106a for 5 additional credits, credit distribution circuit 104 may provide 3 credits or no credits. As a result, cores 106a-n may delay one or more pipeline operations, reducing the rate of energy consumption of central processing unit 100. In some embodiments, using credit distribution circuit 104 to adjust the rate of energy consumption of cores 106a-n may result in central processing unit 100 meeting a desired energy consumption threshold per window of time more quickly, as compared to a system where per core power limits are periodically reduced until an aggregate power of the system as a whole complies with the desired energy consumption threshold.

Alternatively, in some embodiments, instead of providing credits to cores 106a-n, credit distribution circuit 104 may specify to cores 106a-n respective assigned maximum rates of consumption of energy credits. In some embodiments, cores 106a-n may stall one or more pipeline operations in response to determining that the assigned maximum rates may be exceeded by performing the one or more pipeline operations at a particular time (e.g., during a current clock cycle). In some cases, specifying rates of consumption of energy credits may result in fewer communications between credit distribution circuit 104 and cores 106*a-n*, as compared to specifying allocated credits.

Figure 2:
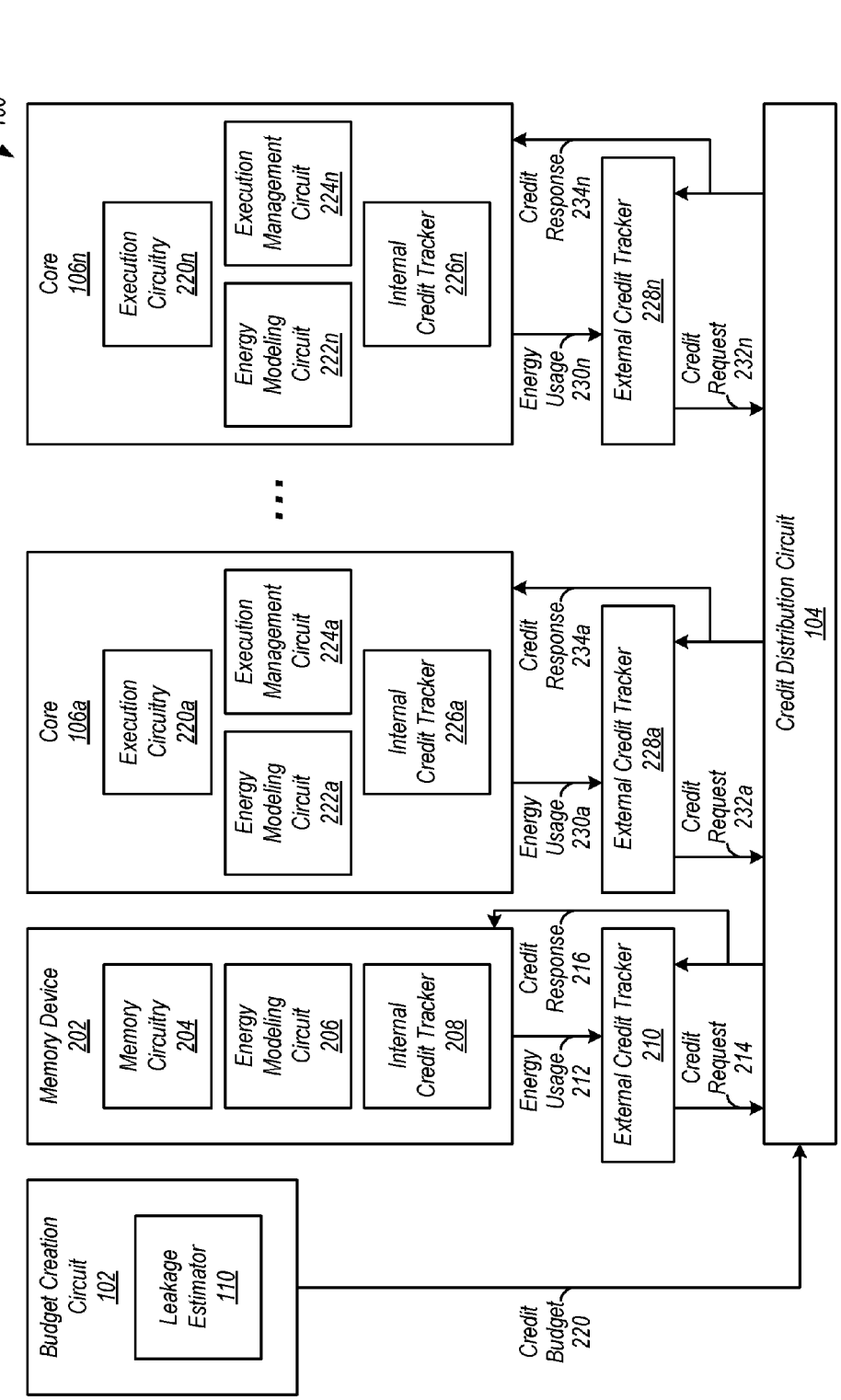
FIG. 2 is a block diagram illustrating functions performed by one embodiment of an exemplary processor energy consumption rate limiting system.
Figure 3:
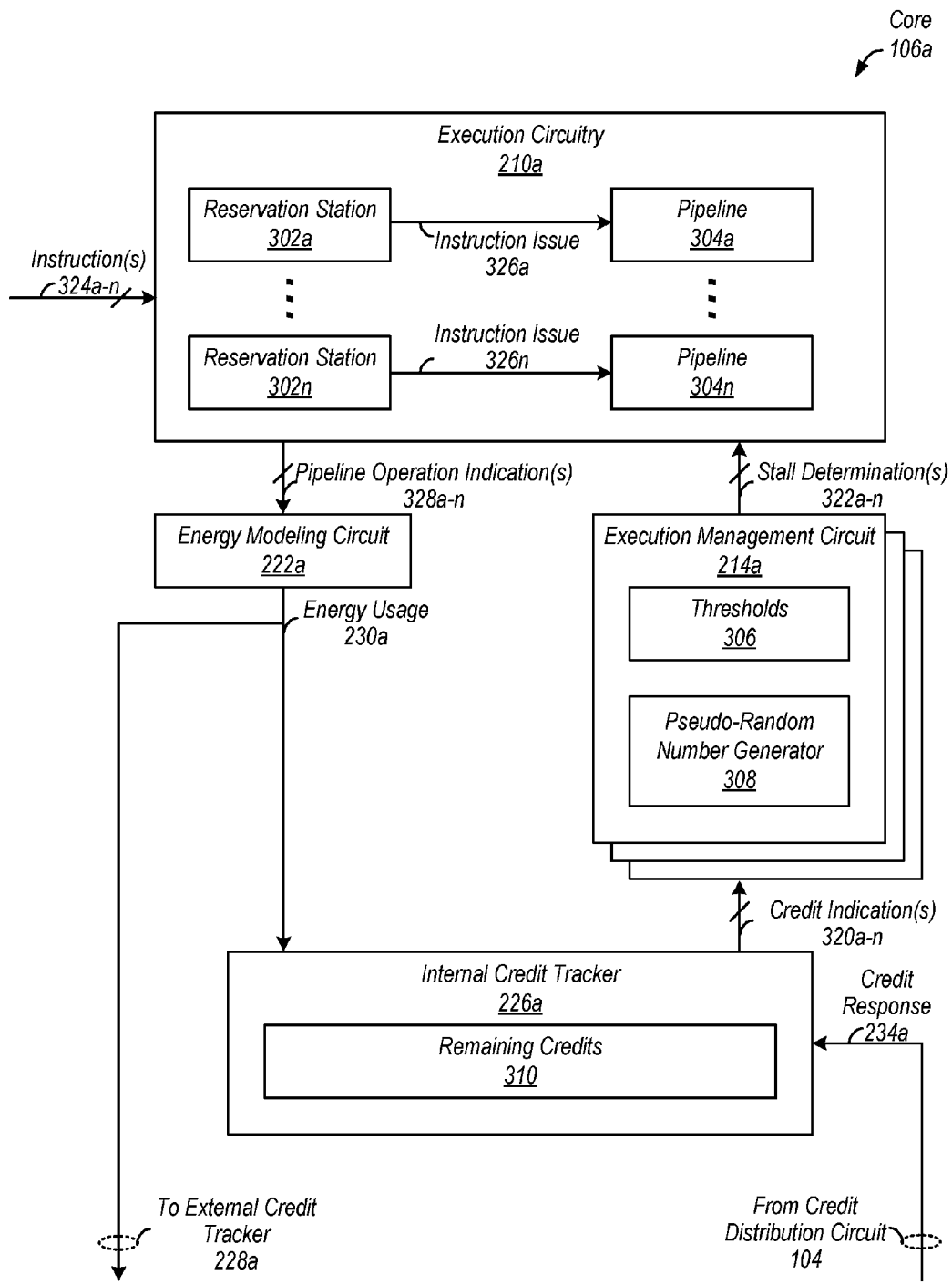
FIG. 3 is a block diagram illustrating one embodiment of an exemplary processor core of an exemplary processor energy consumption rate limiting system.

For ease of description, FIGS. 2 and 3 are described below in terms of credits. However, in some embodiments, credits are not utilized. For example, instead of credits, credit distribution circuit may provide indications of respective maximum amounts of switching capacitance per clock cycle to be used by cores 106*a-n* during at least one clock cycle. Alternatively, other methods of indicating authorization to consume energy may be used.

Turning now to FIG. 2, a block diagram illustrating functions performed by one embodiment of central processing unit 100 is shown. In the illustrated embodiment, central processing unit 100 additionally includes memory device 202, and external credit trackers 210 and 228*a-n*. Memory device 202 includes memory circuitry 204, energy modeling circuit 206, and internal credit tracker 208. Cores 106*a-n* include respective execution circuitry 220*a-n*, energy modeling circuits 222*a-n*, execution management circuits 224*a-n*, and internal credit trackers 226*a-n*. As discussed further below, in other embodiments, central processing unit 100 may not include at least one of memory device 202, external credit tracker 210, or external credit trackers 228*a-n*.

As described above, budget creation circuit 102 may determine an energy budget (e.g., credit budget 220) for cores 106*a-n* and communicate the energy budget to credit distribution circuit 104. In the illustrated embodiment, credit budget 220 further corresponds to memory device 202. In some embodiments, other devices also correspond to credit budget 220. Credit budget 220 indicates a total number of credits to be allocated to at least cores 106*a-n* and memory device 202 during a particular window of time (e.g., during eight clock cycles).

Memory device 202 may perform memory operations at memory circuitry 204 in response to one or more memory requests. Energy modeling circuit 206 may determine a number of credits consumed by the memory operations. In some embodiments, the determined number of credits may be an estimate (e.g., based on a type of memory request). The determined number of credits may be provided to internal credit tracker 208 (an energy tracking circuit) and external credit tracker 210 as energy usage 212. Memory device 202 may be unable to delay one or more operations at memory circuitry 204. Accordingly, internal credit tracker 208 may track a number of credits allocated to memory device 202 and may signal an error in response to memory device 202 having fewer credits than an error threshold amount. In other embodiments, memory device 202 may not include internal credit tracker 208. Additionally, in other embodiments, memory device 202 may be able to delay the one or more operations.

External credit tracker 210 (an external energy tracking circuit) may receive, from memory device 202, energy usage 212 and may, in response to memory device 202 having fewer credits than a request threshold amount, send credit request 214 (an energy allocation request) to credit distribution circuit 104. External credit tracker 210 may be able to communicate with credit distribution circuit 104 more quickly, as compared to internal credit tracker 208. Thus, external credit tracker 210 may provide lower latency credit requests without requiring fast communication channels between memory device 202 and credit distribution circuit 104. As noted above, in some embodiments, memory device 202 is unable to delay one or more operations. Accordingly, credit distribution circuit 104 may prioritize credit request 214, as compared to credit requests 232*a-n* such that credit budget 220 is not exceeded. In response to credit request 214, credit distribution circuit 104 may send to external credit tracker 210 and to memory device 202 credit response 216 (an indication of permission for memory device 202 to use additional energy). In some embodiments, rather than memory device 202 being a memory device, memory device 202 may correspond to another circuit that is unable to delay one or more operations.

As described further below with reference to FIG. 3, cores 106*a-n* may selectively determine whether to perform one or more pipeline operations at execution circuitry 220*a-n* based on whether a sufficient number of respective credits are available. Accordingly, internal credit trackers 226*a-n* may indicate, to execution management circuits 224*a-n*, a respective number of credits allocated to respective cores 106*a-n*. In response to the indication from respective internal credit trackers 226*a-n*, execution management circuits 224*a-n* may be configured to selectively delay performance of the one or more pipeline operations. This process will be described in more detail below with reference to FIG. 3.

Similar to the process described above regarding memory device 202, external credit trackers 228*a-n* may receive indications of energy usage of respective cores 106*a-n* and may track credits allocated to respective cores 106*a-n* in a manner similar to respective internal credit trackers 226*a-n*, as described further below. In response to a number of credits for a respective core being lower than a request threshold amount, external credit trackers 228*a-n* may send respective credit requests 228*a-n* to credit distribution circuit 104. As described above, credit distribution circuit 104 may allocate credits according to an allocation scheme. For example, in response to determining to allocate one or more credits to core 106*a*, credit distribution circuit 104 may send credit response 234*a* to external credit tracker 228*a* and to core 106*a*. Accordingly, the system may use credit distribution circuit 104 to manage execution of operations at cores 106*a-n*.

Turning now to FIG. 3, a block diagram illustrating functions performed by one embodiment of core 106*a* is shown. In the illustrated embodiment, core 106*a* includes additional execution management circuits 214*a* (e.g., each corresponding to one or more of the pipelines 304*a-n*). However, in other embodiments, core 106*a* only includes one execution management circuit 214*a* (e.g., corresponding to all pipelines 304*a-n*). Execution circuitry 210*a* additionally includes one or more reservation stations 302*a-n* and corresponding pipelines 304*a-n*. Execution management circuit(s) 214*a* additionally include thresholds 306 and pseudo-random number generator 308. Internal credit tracker 226*a* additionally includes remaining credits 310. In some embodiments, core 106*a* does not include internal credit tracker 226*a*.

Execution circuitry 210*a* may selectively delay one or more pipeline operations corresponding to instructions 324*a-n*. In particular, execution circuitry 210*a* may receive instructions 324*a-n* corresponding to pipelines 304*a-n*. Execution circuitry 210*a* may store data corresponding to instructions 324*a-n* at reservation stations 302*a-n*. Execution circuitry 210*a* may additionally receive stall determinations 322*a-n* corresponding to pipelines 304*a-n* from execution management circuit(s) 214*a*. In response to receiving an indication not to delay pipeline operations for pipelines 304*a-n*, execution circuitry 210*a* may be configured to issue data corresponding to respective instructions 324*a-n* as part of respective instruction issues 326*a-n* from respective reservation stations 302*a-n* to respective pipelines 304*a-n*. However, in response to stall determinations 322*a-n* indicating a delay of one or more pipeline operations corresponding to at least one of instructions 324*a-n*, execution circuitry 210*a* may selectively indicate at least a portion of one or more stall operations as part of respective instruction issues 324*a-n*. For example, in response to stall determinations 322*a* and 322*d* indicating that instructions 324*a* and 324*d* should be delayed, execution circuitry 210*a* may selectively indicate one or more stall instructions in instruction issues 326*a* and 326*d* such that pipelines 304*a* and 304*d* perform at least a portion of one or more stall operations.

Energy modeling circuit 222*a* may receive one or more pipeline operation indications 328*a-n* from execution circuitry 210*a* and may indicate energy usage of execution circuitry 210*a*. In some embodiments, pipeline operation indications 328*a-n* may correspond to instruction issues 326*a-n*. Energy modeling circuit 222*a* may determine a number of credits associated with performing the pipeline operations indicated by pipeline operation indications 328*a-n* and may indicate the number of credits to internal credit tracker 226*a* and to external credit tracker 228*a* (e.g., a credit tracker able to communicate more quickly with credit distribution circuit 104, as compared to internal credit tracker 226*a*) as energy usage 230*a*. Energy usage 230*a* may be an aggregate energy usage from pipelines 304*a-n* or may represent a plurality of indications of energy usage from at least some of pipelines 304*a-n*. In some embodiments, energy usage 230*a* is determined in units of switching capacitance or another unit of measure that is less affected by a corresponding supply voltage as compared to energy. Accordingly, energy usage 230*a* may be determined without energy modeling circuit 222*a* knowing, for example, supply voltage of core 106*a*. Because such assumptions are used, communication time, calculation time, or both are saved, as compared to a system where energy usage 230*a* is determined in units of, for example, energy.

Internal credit tracker 226*a* may track (e.g., maintain a running tally of) remaining credits 310 allocated to core 106*a*. Accordingly, in response to receiving energy usage 230*a* from energy modeling circuit 222*a*, internal credit tracker 226*a* may reduce remaining credits 310. In response to receiving credit response 234*a*, internal credit tracker 226*a* may increase remaining credits 310. Internal credit tracker 226*a* may periodically indicate remaining credits 310 to execution management circuit(s) 214*a* via credit indications 320*a-n* (e.g., one or more energy indications). In some embodiments (e.g., embodiments where no external credit tracker 228*a* is present), in response to remaining credits 310 falling below a request threshold, internal credit tracker 226*a* may request additional credits from credit distribution circuit 104.

Execution management circuit 214*a* may determine, based on credit indications 320*a-n*, whether to delay execution at one or more of pipelines 304*a-n* (e.g., delaying one or more of instructions 324*a-n*). In some embodiments, execution management circuit 214*a* may compare a number of credits assigned to core 106*a* with at least one of thresholds 306 to determine whether to delay execution at pipelines 304*a-n*. Execution management circuit 214*a* may further determine whether to stall based on an estimated number of credits to be consumed by respective instructions 324*a-n*. Execution management circuit 214*a* may indicate to execution circuitry 210*a* stall determination(s) 322*a-n* based on the comparisons.

For example, execution management circuit 214*a* may compare remaining credits 310 (e.g., a number of remaining credits after execution of one or more previous pipeline operations) and may determine whether remaining credits 310 is less than at least one of thresholds 306. As another example, execution management circuit 214*a* may receive remaining credits 310 and an estimate of a number of credits to be consumed by the instructions at reservation stations 302*a-n*. Execution management circuit 214*a* may determine to delay performance of pipeline operations associated with the instructions in response to remaining credits 310, when reduced by the number of credits to be consumed, being less than at least one of thresholds 306. Although the number of credits is described herein as being smaller than the thresholds, in other embodiments, delaying the one or more pipeline operations may be performed when the number of credits exceeds the one or more thresholds instead (e.g., the credits represent debits, which are added as pipeline operations are performed and removed by credit response 234*a*).

In some embodiments, determining whether to stall one or more pipelines may be performed independently for pipelines 304*a-n*. In some embodiments, execution management circuit 214*a* may prioritize some pipelines over other pipelines. Accordingly, execution management circuit 214*a* may selectively request a delay of performance of one or more pipeline operations at one or more of pipelines 304*a-n* based, for example on remaining credits 310. For example, execution management circuit 214*a* may request a delay of performance of pipeline operations at pipeline 304*a* as long as remaining credits 310 is fewer than 5 and may request a delay of performance of pipeline operations at pipeline 304*b* as long as remaining credits 310 is fewer than 3. In some embodiments, thresholds 306 may vary over time (e.g., to avoid a potential starvation problem).

Additionally, execution management circuit(s) 214*a* may generate a pseudo-random component using pseudo-random number generator 308 and may apply the pseudo-random component to the number of credits, at least one of thresholds 306, or both. The pseudo-random component may be applied to the number of credits, the at least one of thresholds 306, or both in at least one of many different ways (e.g., addition, subtraction, multiplication, division, shifting, logical transformations, etc.). For example, as described further below with reference to FIG. 4, a value of a pseudo-random component may be added to at least one of thresholds 306 and a resulting value may be compared to remaining credits 310 such that a particular pipeline operation may be delayed with some probability (e.g., a determination to delay may be pseudo-probabilistic) while remaining credits 310 is in a potential stall region (e.g., depending on the value of the pseudo-random component). When pseudo-random components are used to make stalling decisions at multiple pipelines (e.g., pipelines of multiple cores) simultaneously, the pipelines are less likely to simultaneously stall or to simultaneously resume execution after a stall, thus reducing an amount of power supply noise associated with decisions to delay/issue pipeline operations.

In some embodiments, when multiple execution management circuits 214*a* are present, a single pseudo-random component may be generated. Alternatively, multiple pseudo-random components may be generated (e.g., potentially staggering stalling within core 106*a*). In other embodiments, the pseudo-random component(s) may be received (e.g., from another circuit outside core 106*a*). The pseudo-random component may be independent of a pseudo-random component used by another core (e.g., core 106*b*). In some embodiments, the pseudo-random components may be generated using a linear distribution number generation algorithm (e.g., an algorithm that generates pseudo-random numbers with an exactly linear distribution), such as by using a linear feedback shift register. Generating the pseudo-random components using the linear distribution number generation algorithm may result in a more predictable stalling behavior of the system, thus potentially enabling control of a system-wide energy consumption rate closer to a requested energy consumption limit for a particular window of time without exceeding the requested energy consumption limit. However, in other embodiments, nonlinear behavior may be desired. Nonlinear behavior may be achieved in multiple ways, such as by using a nonlinear distribution number generation algorithm or by multiplying the pseudo-random component by the threshold 306, the remaining credits 310, or both. Other mathematical methods of applying the pseudo-random component to the comparison may also be used. Accordingly, core 106a may determine whether to delay execution of instructions 324a-n based on remaining credits 310.

Figure 4:
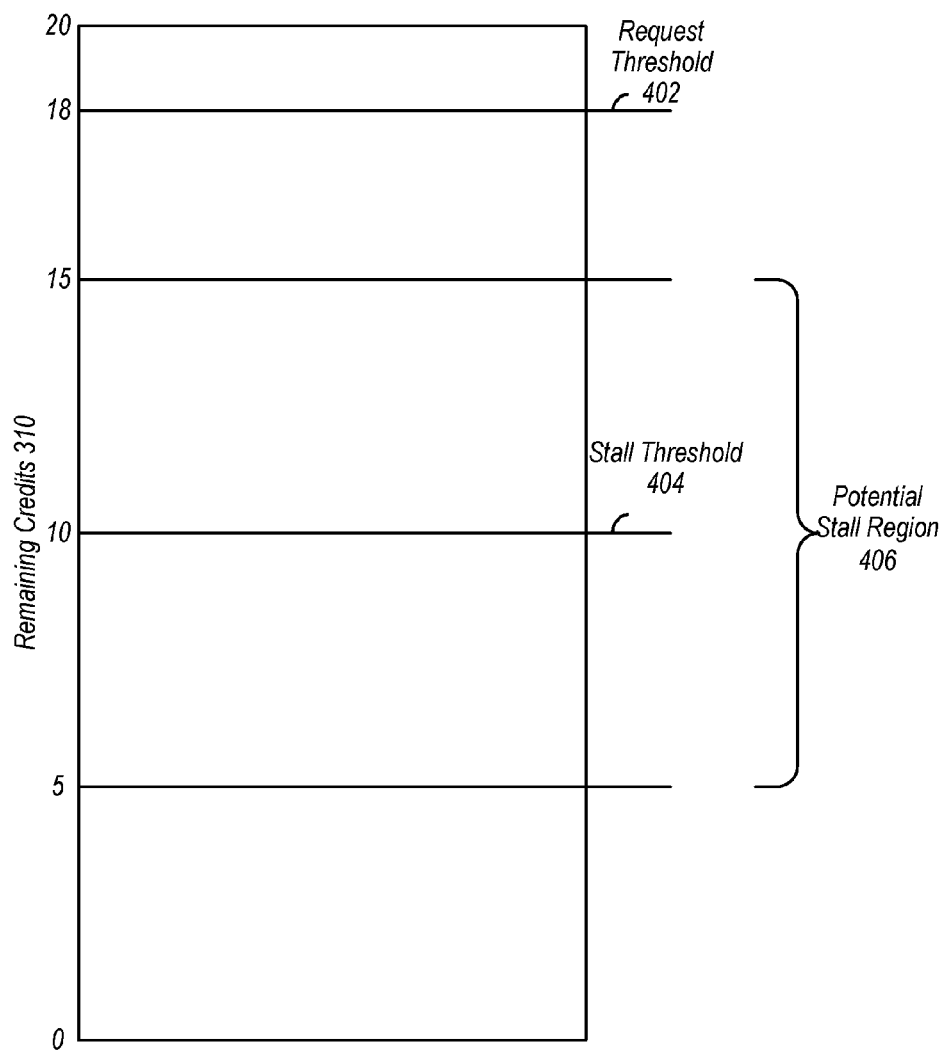
FIG. 4 is a block diagram illustrating a visual depiction of a comparison of two example cases of two embodiments of an energy consumption rate limiting process.

Turning now to FIG. 4, a block diagram illustrating a visual depiction of a comparison of two example cases of two embodiments of an energy consumption rate limiting process is shown. In the illustrated embodiment, a range of potential values of remaining energy within a particular window of time (e.g., credits 310) is shown. Additionally, example values of request threshold 402, stall threshold 404, and potential stall region 406 are shown. In some embodiments, request threshold 402, stall threshold 404, and potential stall region 406 correspond to one or more of thresholds 306 of FIG. 3. Although FIG. 4 provides particular values, these values are for illustration only and it is understood that these values may vary based, for example, on system design.

In the illustrated embodiment, remaining credits 310 ranges from 20 to 0. In other words, core 106a may have as many as 20 credits or as few as 0 credits at any given time. As noted above, the maximum amount of energy that may be allocated to a core for a particular window of time is based on energy that can be stored by energy supply circuitry 108 (e.g., based on a size of decoupling capacitors of energy storage circuit 114).

In the illustrated embodiment, request threshold 402 is set at 18. In one embodiment, when remaining credits 310 is less than 18, additional credits are requested (e.g., by external credit tracker 228a from credit distribution circuit 104). Additionally, in the illustrated embodiment, stall threshold 404 is set at 10. In one embodiment of an energy consumption rate limiting system where a pseudo-random component is not applied, when remaining credits 310 is less than 10, the system determines to delay one or more pipeline operations. Accordingly, in the illustrated embodiment, additional credits are requested prior to remaining credits 310 reaching stall threshold 404 (e.g., so additional credits may potentially be received prior to reaching stall threshold 404). In some embodiments, stall threshold 404 may be determined based on a number of credits associated with a largest group of one or more pipeline operations (e.g., a largest number of credits that may be removed from remaining credits 310 in response to a single instruction).

The illustrated embodiment also illustrates potential stall region 406. Potential stall region 406 illustrates one embodiment of a region in which one or more instructions may be stalled or otherwise delayed (e.g., by throttling) when a pseudo-random component is applied. For example, a pseudo-random component between 1 and 10 may be subtracted from remaining credits 310 and, if a result is less than a lower potential stall region bound (e.g., 5), one or more pipeline operations may be delayed.

In the illustrated embodiment, a range of the pseudo-random component is determined such that, when a linear distribution number generation algorithm is used, an average stall threshold of potential stall region 406 is equal to stall threshold 404. In some cases, when the average stall threshold of potential stall region 406 is equal to stall threshold 404, similar credit budget decisions may be used. In some embodiments, the pseudo-random component is only generated if the pseudo-random component may affect a stalling determination (e.g., if remaining credits 310 is between 5 and 15). In other embodiments, the pseudo-random component is always generated and applied to at least one of the remaining credits 310, or one or more of the threshold(s) (e.g., at least one of stall threshold 404 or one or more thresholds indicated by potential stall region 406).

Figure 5:
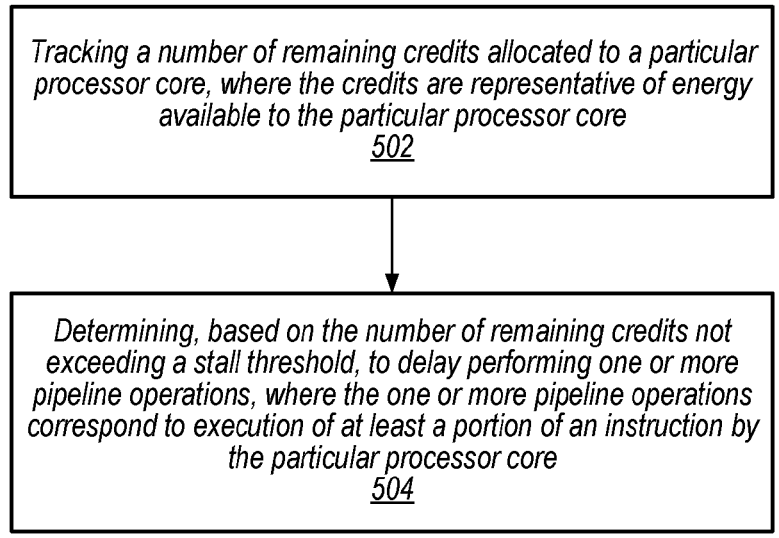
FIG. 5 is a flow diagram illustrating a first embodiment of a method of determining to delay performing one or more pipeline operations.

Referring now to FIG. 5, a flow diagram of a method 500 is depicted. Method 500 is an embodiment of a first embodiment of a method of determining to delay performing one or more pipeline operations, such as pipeline operations corresponding to instructions 324a-n. In some embodiments, the method 500 may be initiated or performed by one or more processors in response to one or more instructions stored by a computer-readable storage medium. Other additional elements may also be performed as desired.

At 502, method 500 includes tracking a number of remaining credits allocated to a particular processor core, where the credits are representative of energy available to the particular processor core. For example, method 500 may include internal credit tracker 226a tracking remaining credits 310 allocated to core 106a.

At 504, method 500 includes determining, based on the number of remaining credits not exceeding a stall threshold, to delay performing one or more pipeline operations, where the one or more pipeline operations correspond to execution of at least a portion of an instruction by the particular processor core. For example, method 500 may include execution management circuit 214a determining to delay performance of one or more pipeline operations corresponding to execution of at least a portion of instruction 324a based on remaining credits 310 not exceeding stall threshold 404 of thresholds 306. Accordingly, a method of determining to delay performing one or more pipeline operations is depicted.

Figure 6:
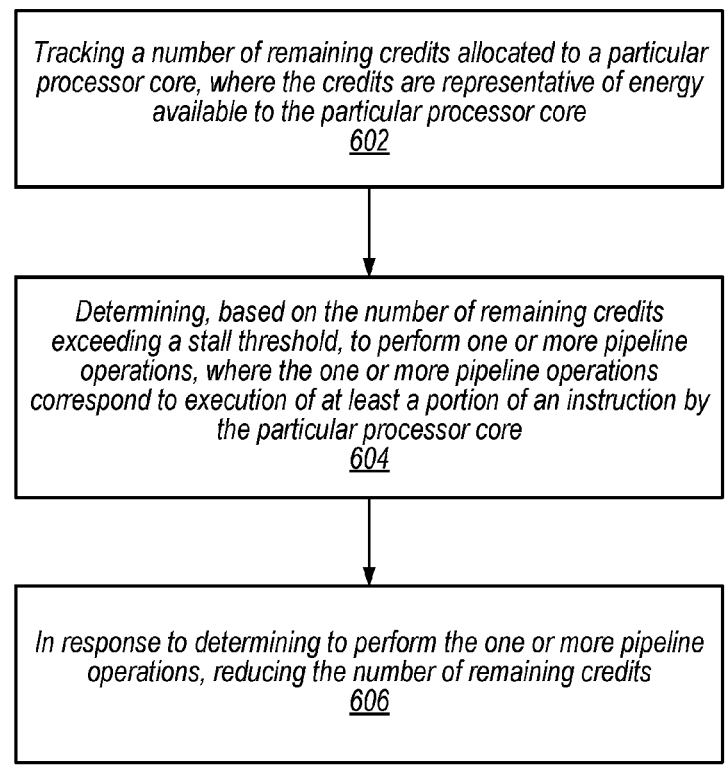
FIG. 6 is a flow diagram illustrating a first embodiment of a method of determining to perform one or more pipeline operations.

Referring now to FIG. 6, a flow diagram of a method 600 is depicted. Method 600 is an embodiment of a first embodiment of a method of determining not to delay performing one or more pipeline operations, such as pipeline operations corresponding to instructions 324a-n. In some embodiments, the method 600 may be initiated or performed by one or more processors in response to one or more instructions stored by a computer-readable storage medium. Other additional elements may also be performed as desired.

At 602, method 500 includes tracking a number of remaining credits allocated to a particular processor core, where the credits are representative of energy available to the particular processor core. For example, method 600 may include internal credit tracker 226a tracking remaining credits 310 allocated to core 106a.

At 604, method 600 includes determining, based on the number of remaining credits exceeding a stall threshold, to perform one or more pipeline operations, where the one or more pipeline operations correspond to execution of at least a portion of an instruction by the particular processor core. For example, method 600 may include execution management circuit 214a determining to perform of one or more pipeline operations corresponding to execution of at least a portion of instruction 324a based on remaining credits 310 exceeding stall threshold 404 of thresholds 306. Accordingly, a method of determining not to delay performing one or more pipeline operations is depicted.

Figure 7:
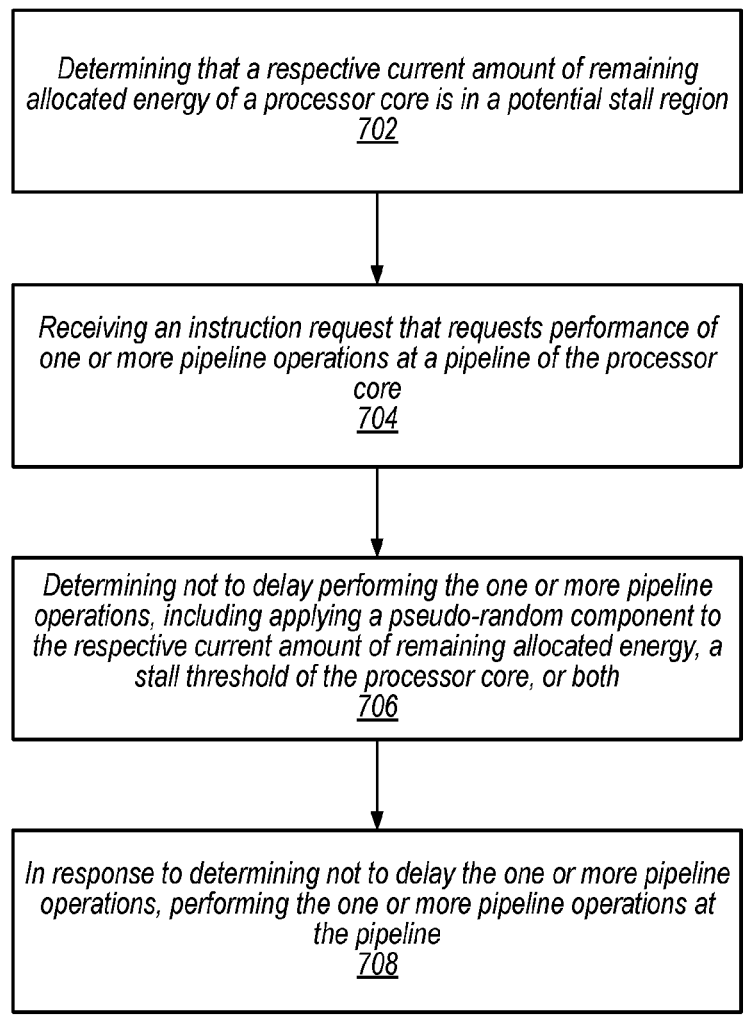
FIG. 7 is a flow diagram illustrating a second embodiment of a method of determining not to delay performing one or more pipeline operations.

Referring now to FIG. 7, a flow diagram of a method 700 is depicted. Method 700 is an embodiment of a second embodiment of a method of determining not to delay performing one or more pipeline operations, such as pipeline operations corresponding to instructions 324a-n. In some embodiments, the method 700 may be initiated or performed by one or more processors in response to one or more instructions stored by a computer-readable storage medium. For purposes of discussion, the elements of this embodiment are shown in sequential order. It should be noted that in various embodiments of the method 700, one or more of the elements described may be performed concurrently, in a different order than shown, or may be omitted entirely. Other additional elements may also be performed as desired.

At 702, method 700 includes determining that a respective current amount of remaining allocated energy of a processor core is in a potential stall region. For example, method 700 may include execution management circuit 214a determining that remaining credits 310 (e.g., remaining energy) of core 106a is in potential stall region 406.

At 704, method 700 includes receiving an instruction request that requests performance of one or more pipeline operations at a pipeline of the processor core. For example, method 700 may include receipt of instructions 324a-n, requesting performance of one or more pipeline operations at pipeline 304a.

At 706, method 700 includes determining not to delay performing the one or more pipeline operations, including applying a pseudo-random component to the respective current amount of remaining allocated energy, a stall threshold of the processor core, or both. For example, method 700 may include execution management circuit 214a determining not to delay performance of instructions 324a-n based on applying a pseudo-random component from pseudo-random number generator 308 to remaining credits 310, to stall threshold 404, or both.

At 708, method 700 includes in response to determining not to delay the one or more pipeline operations, performing the one or more pipeline operations at the pipeline. For example, method 700 may perform the one or more pipeline operations at pipeline 304a. Accordingly, a method of determining not to delay performing one or more pipeline operations is depicted.

Figure 8:
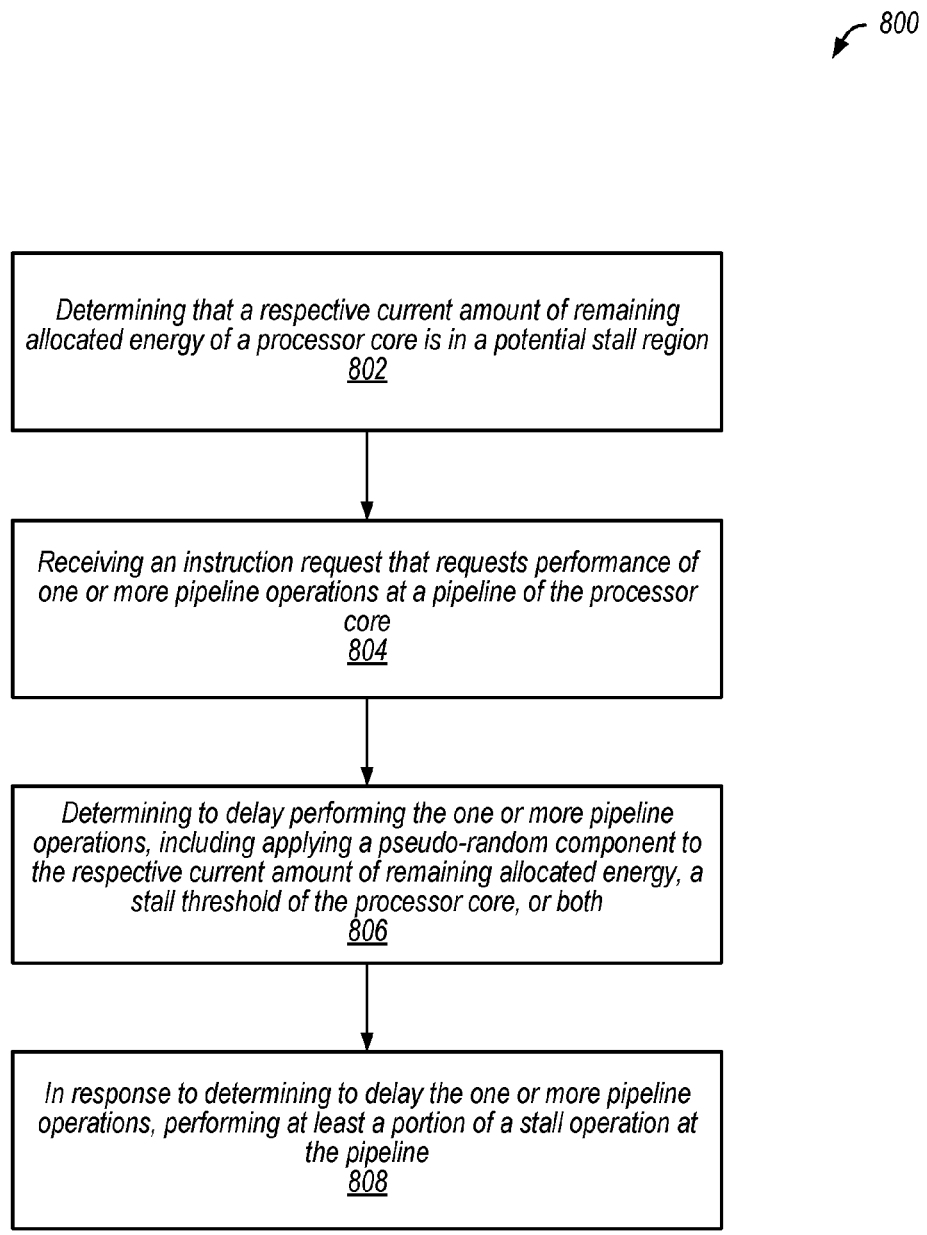
FIG. 8 is a flow diagram illustrating a second embodiment of a method of determining to delay performing one or more pipeline operations.

Referring now to FIG. 8, a flow diagram of a method 800 is depicted. Method 800 is an embodiment of a second embodiment of a method of determining to delay performance of one or more pipeline operations, such as pipeline operations corresponding to instructions 324a-n. In some embodiments, the method 800 may be initiated or performed by one or more processors in response to one or more instructions stored by a computer-readable storage medium. For purposes of discussion, the elements of this embodiment are shown in sequential order. It should be noted that in various embodiments of the method 800, one or more of the elements described may be performed concurrently, in a different order than shown, or may be omitted entirely. Other additional elements may also be performed as desired.

At 802, method 800 includes determining that a respective current amount of remaining allocated energy of a processor core is in a potential stall region. For example, method 800 may include execution management circuit 214a determining that remaining credits 310 (e.g., remaining energy) of core 106a is in potential stall region 406.

At 804, method 800 includes receiving an instruction request that requests performance of one or more pipeline operations at a pipeline of the processor core. For example, method 800 may include receipt of instructions 324a-n, requesting performance of one or more pipeline operations at pipeline 304a.

At 806, method 800 includes determining to delay performing the one or more pipeline operations, including applying a pseudo-random component to the respective current amount of remaining allocated energy, a stall threshold of the processor core, or both. For example, method 800 may include execution management circuit 214a determining to delay performance of instructions 324a-n based on applying a pseudo-random component from pseudo-random number generator 308 to remaining credits 310, to stall threshold 404, or both.

At 808, method 800 includes in response to determining to delay the one or more pipeline operations, performing at least a portion of a stall operation at the pipeline. For example, method 800 may perform at least a portion of a stall operation at pipeline 304a. Accordingly, a method of determining to delay performance of one or more pipeline operations is depicted.

Figure 9:
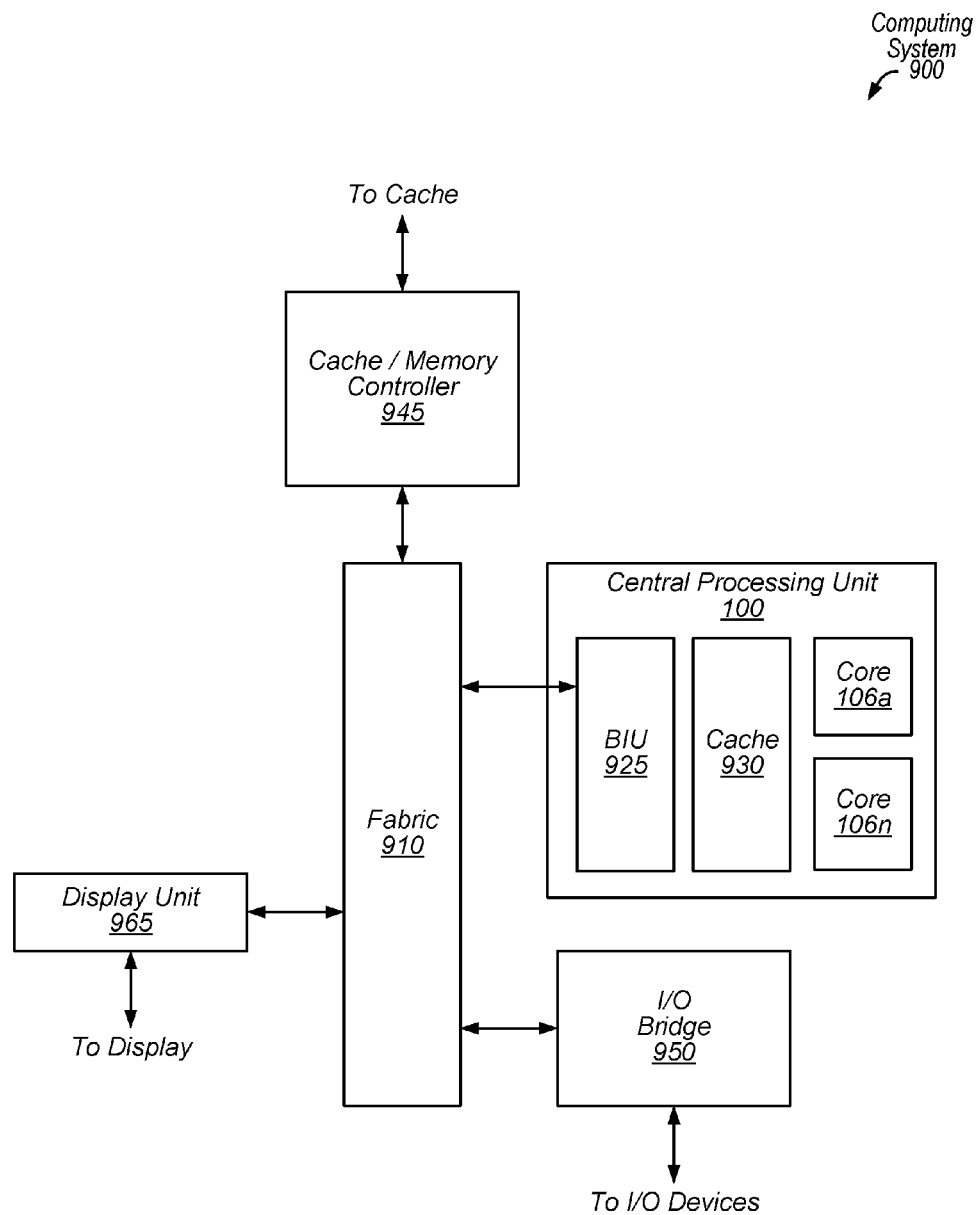
FIG. 9 is block diagram illustrating an embodiment of an exemplary computing system that includes at least a portion of an exemplary processor energy consumption rate limiting system.

Turning next to FIG. 9, a block diagram illustrating an exemplary embodiment of a computing system 900 that includes at least a portion of an exemplary processor energy consumption rate limiting system. The computing system 900 includes central processing unit 100 of FIG. 1. In some embodiments, central processing unit 100 includes one or more of the circuits described above with reference to FIGS. 1-8, including any variations or modifications described previously with reference to FIGS. 1-8. In some embodiments, some or all elements of the computing system 900 may be included within a system on a chip (SoC). In some embodiments, computing system 900 is included in a mobile device. Accordingly, in at least some embodiments, area and power consumption of the computing system 900 may be important design considerations. In the illustrated embodiment, the computing system 900 includes fabric 910, central processing unit (CPU) 100, input/output (I/O) bridge 950, cache/memory controller 945, and display unit 965. Although the computing system 900 illustrates central processing unit 100 as being connected to fabric 910 as a sole central processing unit of the computing system 900, in other embodiments, central processing unit 100 may be connected to or included in other components of the computing system 900 and other central processing units may be present. Additionally or alternatively, the computing system 900 may include multiple central processing units 100. The multiple central processing units 100 may correspond to different embodiments or to the same embodiment.

Fabric 910 may include various interconnects, buses, MUXes, controllers, etc., and may be configured to facilitate communication between various elements of computing system 900. In some embodiments, portions of fabric 910 are configured to implement various different communication protocols. In other embodiments, fabric 910 implements a single communication protocol and elements coupled to fabric 910 may convert from the single communication protocol to other communication protocols internally.

In the illustrated embodiment, central processing unit 100 includes bus interface unit (BIU) 925, cache 930, and cores 106a and 106n. In various embodiments, central processing unit 100 includes various numbers of cores and/or caches. For example, central processing unit 100 may include 1, 2, or 4 processor cores, or any other suitable number. In some embodiments, cores 106a and/or 106n include internal instruction and/or data caches. In some embodiments, a coherency unit (not shown) in fabric 910, cache 930, or elsewhere in computing system 900 is configured to maintain coherency between various caches of computing system 900. BIU 925 may be configured to manage communication between central processing unit 100 and other elements of computing system 900. Processor cores such as cores 106a and 106n may be configured to execute instructions of a particular instruction set architecture (ISA), which may include operating system instructions and user application instructions. In some embodiments, central processing unit 100 is configured to manage energy consumption at central processing unit 100.

Cache/memory controller 945 may be configured to manage transfer of data between fabric 910 and one or more caches and/or memories (e.g., non-transitory computer readable mediums). For example, cache/memory controller 945 may be coupled to an L3 cache, which may, in turn, be coupled to a system memory. In other embodiments, cache/memory controller 945 is directly coupled to a memory. In some embodiments, the cache/memory controller 945 includes one or more internal caches. In some embodiments, the cache/memory controller 945 may include or be coupled to one or more caches and/or memories that include instructions that, when executed by one or more processors (e.g., central processing unit 100 and/or one or more cores 106a, 106n), cause the processor, processors, or cores to initiate or perform some or all of the processes described above with reference to FIGS. 5-8.

As used herein, the term "coupled to" may indicate one or more connections between elements, and a coupling may include intervening elements. For example, in FIG. 9, display unit 965 may be described as "coupled to" central processing unit 100 through fabric 910. In contrast, in the illustrated embodiment of FIG. 9, display unit 965 is "directly coupled" to fabric 910 because there are no intervening elements.

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display).

I/O bridge 950 may include various elements configured to implement: universal serial bus (USB) communications, security, audio, and/or low-power always-on functionality, for example. I/O bridge 950 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 900 via I/O bridge 950. In some embodiments, central processing unit 100 may be coupled to computing system 900 via I/O bridge 950.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor core, comprising:
    an energy tracking circuit configured to determine an amount of remaining allocated energy of the processor core; and
    an execution management circuit configured to make a determination whether to delay performing one or more pipeline operations at the processor core based on a comparison of the amount of remaining allocated energy to a stall threshold, wherein the comparison involves applying a pseudo-random component to the amount of remaining allocated energy, the stall threshold, or both.

2. The processor core of claim 1, wherein the execution management circuit is configured to make the determination in response to the amount of remaining allocated energy being in a potential stall region.

3. The processor core of claim 1, wherein energy tracking circuit is an internal credit tracker configured to determine the amount of remaining allocated energy using credits as a unit of measure.

4. The processor core of claim 1, further comprising an energy modeling circuit configured to provide, to the energy tracking circuit, an indication of an amount of energy used by one or more previous pipeline operations.

5. The processor core of claim 4, wherein the energy modeling circuit is further configured to provide the indication of the amount of energy to an external energy tracking circuit.

6. The processor core of claim 4, wherein the energy modeling circuit is configured to provide the indication of the amount of energy using one or more switching capacitance values.

7. The processor core of claim 4, wherein the energy modeling circuit is configured to provide the indication of the amount of energy without an indication of a current voltage of the processor core.

8. The processor core of claim 1, wherein the energy tracking circuit is configured to:
    receive, from an energy permission circuit, an indication of permission for the processor core to use additional energy; and
    in response to the indication of permission, increase the amount of remaining allocated energy of the processor core.

9. The processor core of claim 1, wherein delaying performing the one or more pipeline operations comprises executing at least a portion of a stall instruction.

10. A method, comprising:
    determining, by a processor core, that an amount of remaining allocated energy of the processor core is in a potential stall region;
    receiving, by the processor core, an instruction request that requests performance of one or more pipeline operations at a pipeline of the processor core;
    determining, by the processor core, not to delay performing the one or more pipeline operations, wherein the determining not to delay performing the one or more pipeline operations comprises applying a pseudo-random component to the amount of remaining allocated energy, a stall threshold of the processor core, or both; and in response to determining not to delay performing the one or more pipeline operations, performing, by the processor core, the one or more pipeline operations at the pipeline.

11. The method of claim 10, further comprising reducing the amount of remaining allocated energy based on determining not to delay the one or more pipeline operations.

12. The method of claim 10, wherein the determination involves applying the pseudo-random component to the amount of remaining allocated energy and determining whether a resulting energy value is greater than the stall threshold.

13. The method of claim 12, wherein applying the pseudo-random component to the amount of remaining allocated energy includes adding the pseudo-random component to the amount of remaining allocated energy.

14. The method of claim 12, wherein applying the pseudo-random component to the amount of remaining allocated energy includes multiplying the pseudo-random component by the amount of remaining allocated energy.

15. A method, comprising:
determining, by a processor core, that an amount of remaining allocated energy of the processor core is in a potential stall region;
receiving, by the processor core, an instruction request that requests performance of one or more pipeline operations at a pipeline of the processor core; and
determining, by the processor core, to delay performing the one or more pipeline operations, wherein the determining to delay performing the one or more pipeline operations comprises applying a pseudo-random component to the amount of remaining allocated energy, a stall threshold of the processor core, or both; and
in response to determining to delay performing the one or more pipeline operations, performing, by the processor core, at least a portion of a stall operation at the pipeline.

16. The method of claim 15, further comprising:
subsequent to determining that the amount of remaining allocated energy is in the potential stall region, receiving, by the processor core, a different instruction request that requests performance of one or more different pipeline operations at a different pipeline of the processor core; and
determining, by the processor core, not to delay performing the one or more different pipeline operations, wherein the determining not to delay performing the one or more different pipeline operations comprises applying a different pseudo-random component to the amount of remaining allocated energy, the stall threshold of the processor core, or both; and
in response to determining not to delay performing the one or more different pipeline operations, performing, by the processor core, the one or more different pipeline operations at the different pipeline.

17. The method of claim 15, further comprising:
determining, by a second processor core, that a second amount of remaining allocated energy of the second processor core is in a second potential stall region;
receiving, by the second processor core, a second instruction request that requests performance of one or more different pipeline operations at a pipeline of the second processor core; and
determining, by the second processor core, not to delay performing the one or more different pipeline operations, wherein the determining not to delay performing the one or more different pipeline operations comprises applying a second pseudo-random component to the second amount of remaining allocated energy, a second stall threshold of the second processor core, or both; and
in response to determining not to delay performing the one or more different pipeline operations, performing, by the second processor core, the one or more different pipeline operations at the pipeline of the second processor.

18. The method of claim 17, wherein the pseudo-random component is generated independently from the second pseudo-random component.

19. The method of claim 17, wherein at least a portion of the one or more different pipeline operations are performed concurrently with at least some of the at least a portion of the stall operation.

20. The method of claim 15, further comprising generating the pseudo-random component using a linear distribution number generation algorithm.

* * * * *